Feb. 3, 1931.  W. G. JOHNSON  1,791,448
HEAVY DUTY CASTER
Filed May 27, 1927
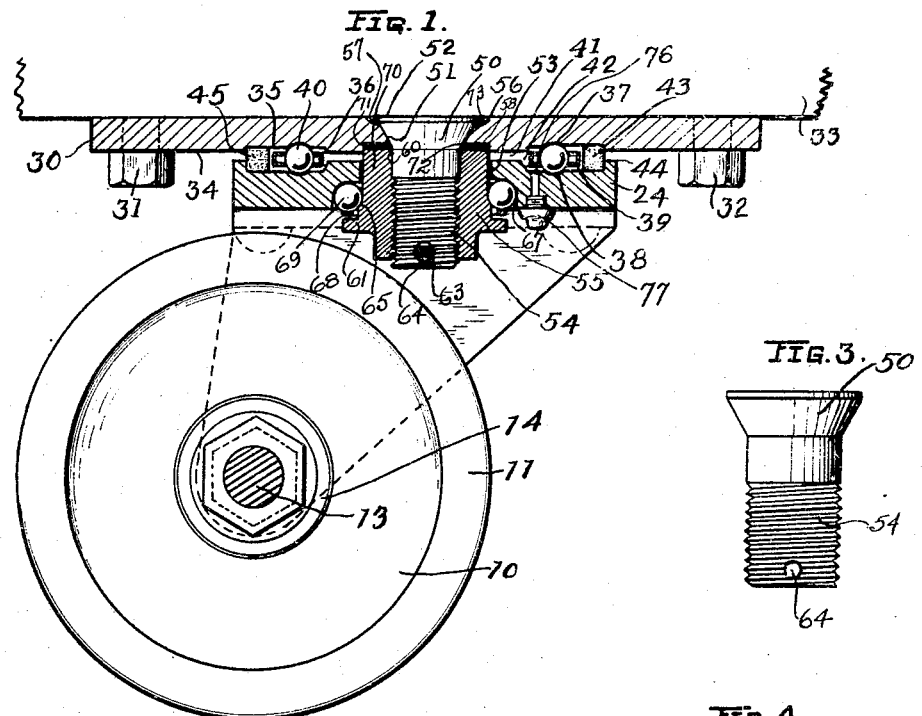
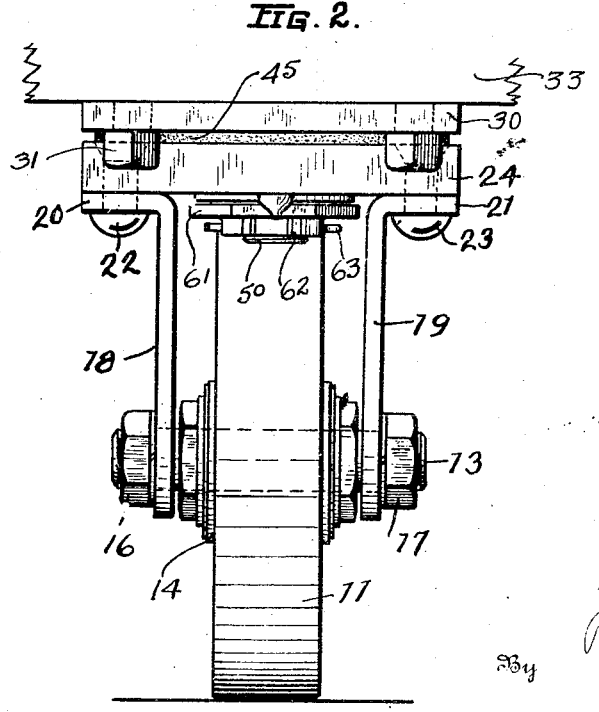
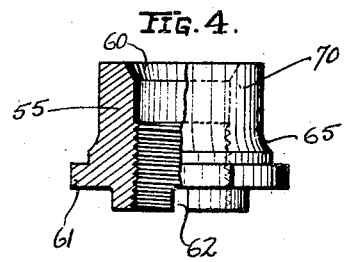
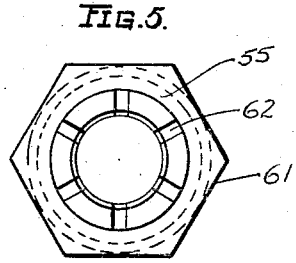
Inventor
Wilfred D. Johnson,
Frank M. Slough
By
His Attorney.

Patented Feb. 3, 1931

1,791,448

UNITED STATES PATENT OFFICE

WILFRED G. JOHNSON, OF ELYRIA, OHIO, ASSIGNOR TO THE COLSON COMPANY, OF ELYRIA, OHIO, A CORPORATION OF OHIO

HEAVY-DUTY CASTER

Application filed May 27, 1927. Serial No. 194,603.

My invention relates to casters and more particularly it relates to an improved heavy duty swivelable ball bearing caster.

An object of my invention resides in the provision of an improved heavy duty caster comprised of a minimum number of parts securely held together against accidental disengagement with each other and which parts may, when desired, be disassembled or adjusted relative to each other.

Another object of my invention resides in the provision of an improved caster of a heavy duty type which is constructed of sheet metal to insure durability, having provision to render the same quiet in use, and wherein friction between the various parts comprising the same and lateral stresses acting thereon are reduced to a minimum.

These and other objects of my invention and the invention itself will become apparent from reference to the following description of an embodiment therein and in which description reference will be had to the accompanying drawings forming a part of this specification.

Referring to the drawings:

Fig. 1 is a vertical, medial, sectional view of an embodiment of my invention, some of the parts being illustrated in elevation;

Fig. 2 is an end elevational view of the foregoing embodiment;

Fig. 3 is a side elevational view of a king pin employed in the foregoing embodiment; and Figs. 4 and 5 are fragmentary sectional, and plan views, respectively of a portion of foregoing embodiment.

Referring to all of the figures of the drawings, in all of which like parts are designated by like reference characters, and wherein I have illustrated my improved caster preferably comprising a relatively large sheet metal caster supporting wheel 10 having a resilient rubber tire 11 disposed about the periphery thereof to insure quietness in use. This wheel is anti-frictionally rotatably mounted on an axle 13 by virtue of interposed ball bearing races 14. The axle 13 projects through aligned openings in a pair of depending caster forks 18 and 19 and is secured therein by nuts 16 and 17. The caster forks formed with flanges 20 and 21 at their upper ends which flanges are riveted at 22 and 23 to a caster race plate 24 to form a fabricated sheet metal caster yoke. A relatively enlarged upper bearing ball race plate 30 is secured by bolts 31 and 32 to a supporting article indicated at 33 directly above the lower plate 24 and is connected therewith by a king pin or bolt 50 and tubular bearing cone 55 which will be hereinafter described in detail.

The bottom wall 34 of the upper plate 30 is provided with an annular groove 35 disposed directly above a similar annular groove 36 formed in the top wall of the lower plate 24. Said grooves are provided with annular concentric anti-friction ball receiving concaved races 37 and 38, respectively, disposed between the side walls of the groove. A clearance 42 is so provided between the plates 24 and 30 of sufficient size to receive a ball-bearing cage 39 having a plurality of bearing balls interposed therebetween out of contact with the plates, with the balls 40 carried therein disposed within the races 37 and 38 and spacing the upper and lower plates. A lubricant may be placed within the space 42 formed by the grooves to lubricate the bearing ball races. An annular felt washer 43 is compressed between the plates 30 and 24 and retained therein from lateral movement by the upstanding annular flange 44 and the depending annular flange 45, which flanges form the outer side walls, respectively, of the annular grooves 35 and 36 of the plates 30 and 24, respectively.

The caster yoke is preferably detachably secured to the upper plate 30 by virtue of the bolt or king pin 50 heretofore referred to, having a countersunk head 51 disposed within the countersunk aperture 52 of the top plate 30 and is provided with a threaded portion 54 extending downwardly through an axially aligned relatively large bore 53 in the lower plate 24. The lower threaded end 54 of the king pin 50 extends below the plate 24 but out of contact with the periphery of the tire 11 and is adapted to receive the tubular cone 55 threaded thereon.

Diametrically opposed recesses 56 and 57 are formed in the upper face of the top plate adjacent the countersunk aperture whereby the countersunk head of the bolt when placed in the aperture 52 may be struck by a punch or any such suitable tool at portions adjacent the recesses 56 and 57 to press a portion 73 of the head into the recesses to lock the bolt in the countersunk aperture against rotation relative to the upper plate 30.

The cone 55 has a cylindrical portion 70 extending upwardly through the bore 53 of the plate 24 into an annular recess 58 and snugly engages the wall 71 thereof. This recess is disposed in the center portions of the plate 30 concentric with the countersunk opening 52, and the aligned bore 53 in the lower plate 24. The upper interior wall peripheral edge of the cone is inclined at 60, which inclined wall receives the lower portion of the countersunk head 51 of the bolt or king pin 50, whereby the cone and the pin engage each other and are prevented from tilting or undue relative lateral movement, but which are so related that rotative movement therebetween is possible. A laminæ of metallic shims 72 are interposed between the upper end of the cone and the upper face of the recess to permit the cone to be adjusted relative to the king pin to take up any wear resulting from the bearing balls revolving in the ball races.

The lower end of the cone is formed with an integral castellated hexagonal nut 61, the slots 62 formed in the nut which may be turned into alignment with a transverse bore 64 in the king pin 50 and a cotter pin 63 may be disposed transversely of an opposed pair of the slots when the slots and bore have been aligned to hold the collar on the king pin.

A ball race 65 is formed on the exterior wall of the cone intermediate the ends thereof and directly above the castellated nut 61. The race 65, when the cone has been mounted on the king pin, is disposed in the bore 53 of the plate 24 concentric with the annular race groove 67 formed in the under face of the plate 24 and concentric with the bore 53. A ball bearing cage 68 having a plurality of bearing balls 69 is interposed between the cone 55 and the groove 67 to provide an antifrictional bearing.

A lubricant duct 76 may be provided in the plate 24, communicating with the annular grooves 42 and with a lubricant valve fixture 77 of a well known type which is adapted to receive the nozzle of a lubricant supplying container to replenish the supply of lubricant to the caster when desired.

A slight clearance between the upper exterior wall of the collar provides a lubricant duct to enable a portion of the lubricant contained in the upper ball bearing race groove to flow downwardly into the lower ball bearing race groove to lubricate the same.

A caster constructed with a bolt or king pin 50 described in the foregoing embodies many advantages in that it is capable of being disassembled for replacement of worn parts. It is also possible that my invention embodies provision for adjustment of the various parts comprising the same whereby any play between the wearing parts may be taken up readily and effectively.

My improved caster is particularly applicable to hand trucks and the like which support heavy loads. I, therefore, contemplate constructing the various parts of the caster, of a pressed sheet steel and I also contemplate hardening the various portions of the caster which are subjected to the greatest wear and thus insure durability and economy in construction.

The upper bearing balls 40 are so positioned relative to the plate 24 that they will receive nearly all of the direct load while the lower concentrically disposed bearing balls support the remaining weight and at the same time receive any lateral thrusts on the caster.

Although I prefer to mount the bearing balls in cages as illustrated and described, I sometimes contemplate disposing the bearing balls in the ball receiving groove with the cages omitted, by providing grooved races on both the upper and lower plate, a smooth working and more durable bearing is secured, whereby the wear is more uniformly distributed and at the same time is reduced to a minimum.

The above described construction will enable the caster to swivel about a vertical axis and the cone 55 will prevent lateral displacement set up by the lateral thrusts and stresses and the serviceability of the caster will be increased.

Having thus described my invention in a specific embodiment I am aware that numerous and extensive departures may be made from the embodiment herein illustrated and described, but without departing from the spirit of my invention.

I claim:

1. In a caster adapted for heavy duty service, in combination, a top plate having an aperture therethrough, the lateral walls of the aperture converging toward a lateral side of the plate, a caster fork having an apertured yoke recessed on its lower side concentric with its aperture, said top plate and yoke being in superposed relation with their apertures in axial alignment, a king pin having a tapered head adapted to interfit closely with the converging walls of said plate aperture projected through both said apertures and recesses, a tubular bearing cone having a lower annular flange screw threaded on to the lower end of the king pin and by an upper end adapted to adjustably approach the said top plate, a plurality of thin, annular, sheet metal shims, of a selected number and thickness adapted to adjustably space the said upper end of the bearing cone from the lower side of said plate; a set of bearing balls interposed between the top plate and yoke and a second set of bearing balls disposed within the yoke recess between the yoke and said flange.

2. In a caster adapted for heavy duty service, in combination, an apertured top plate recessed on its lower side, a caster wheel, a supporting fork having an apertured yoke recessed on its lower side concentric with its aperture, said top plate and yoke superposed with their apertures in axial alignment, a pin projected through both said apertures and recesses, removable spacing washer means susceptable of variation in thickness disposed within said plate recess, a tubular bearing cone having an outwardly extending annular flange, spaced from one of its ends, adapted to be screw threaded onto the lower end of said pin, and engaging and adapted to tightly clamp said spacing washer means between its said end and the end wall of the plate recess, a set of bearing balls interposed between said top plate and said yoke, and a second pair of bearing balls disposed between said yoke and said flange and within said yoke recess.

In testimony whereof I hereunto affix my signature this 14th day of March, 1927.

WILFRED G. JOHNSON.